March 10, 1925.
J. SPRING
HOUSING AND SUPPORT FOR PHONOGRAPH MOTORS
Filed Sept. 30, 1921
1,528,958
2 Sheets-Sheet 1
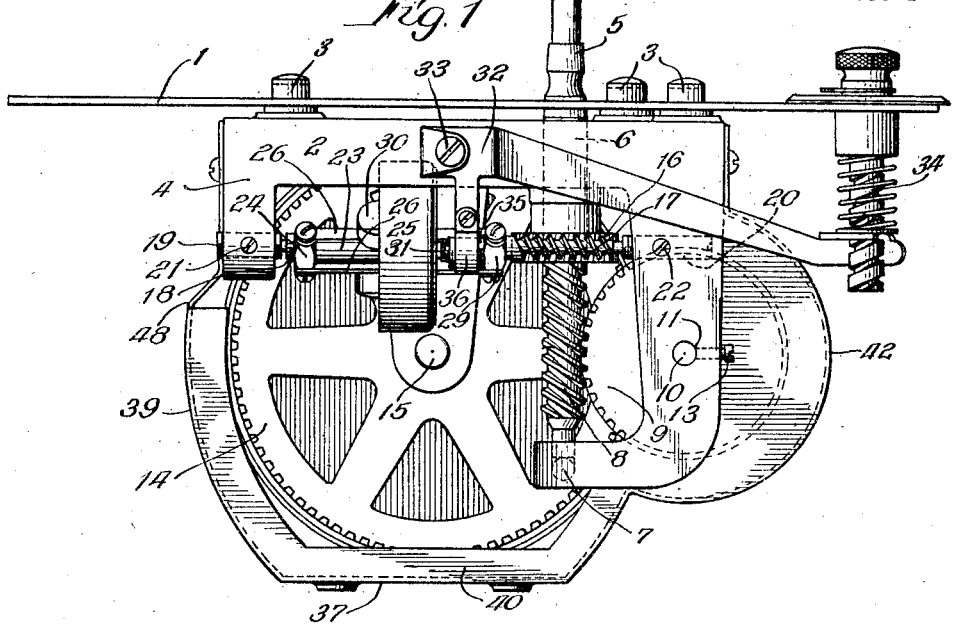
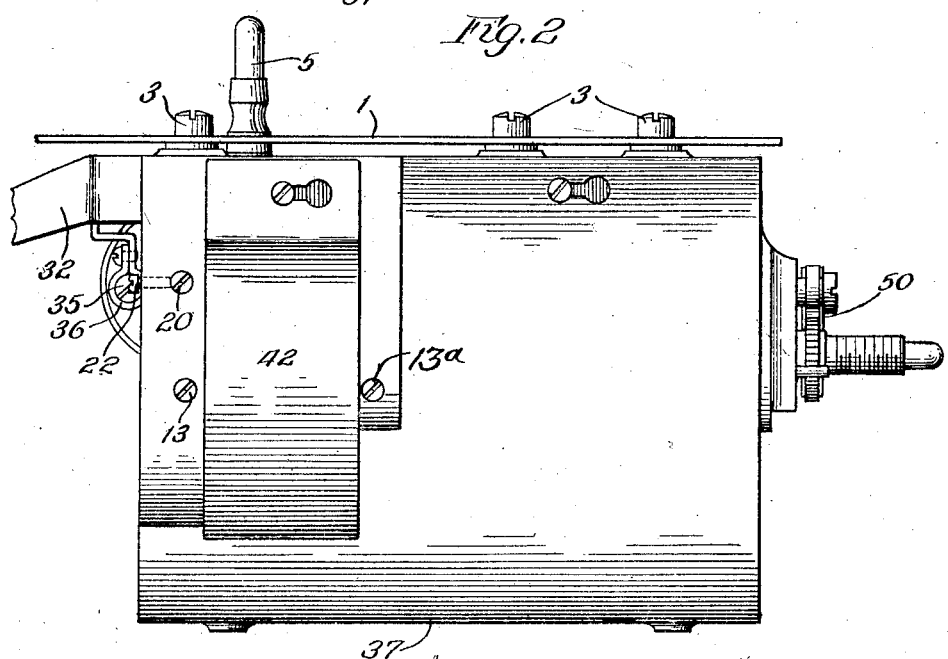
Inventor:
Joseph Spring
By: Wm O Bell
Atty.

March 10, 1925.

J. SPRING

HOUSING AND SUPPORT FOR PHONOGRAPH MOTORS

Filed Sept. 30, 1921 2 Sheets-Sheet 2

1,528,958

Inventor:
Joseph Spring
By Wm. O. Belt
Atty.

Patented Mar. 10, 1925.

1,528,958

UNITED STATES PATENT OFFICE.

JOSEPH SPRING, OF CHICAGO, ILLINOIS, ASSIGNOR TO THE BRUNSWICK-BALKE-COLLENDER COMPANY, OF CHICAGO, ILLINOIS, A CORPORATION OF DELAWARE.

HOUSING AND SUPPORT FOR PHONOGRAPH MOTORS.

Application filed September 30, 1921. Serial No. 504,451.

*To all whom it may concern:*

Be it known that I, JOSEPH SPRING, a citizen of the United States, residing at Chicago, in the county of Cook and State of Illinois, have invented certain new and useful Improvements in Housings and Supports for Phonograph Motors, of which the following is a specification.

This invention relates to phonograph motors, and has for its principal object to provide a combined housing and support for the motor which will protect the motor in handling and shipping, form the oil pan for the motor in use and form a support to hold the motor in position to be readily adjusted.

Other objects will become apparent as the description is read in connection with the accompanying drawing wherein is shown a selected embodiment of the invention and in which Fig. 1 is an end elevation showing the housing with the motor resting thereon;

Fig. 2 is a side elevation looking at the right side of Fig. 1;

Figure 3:
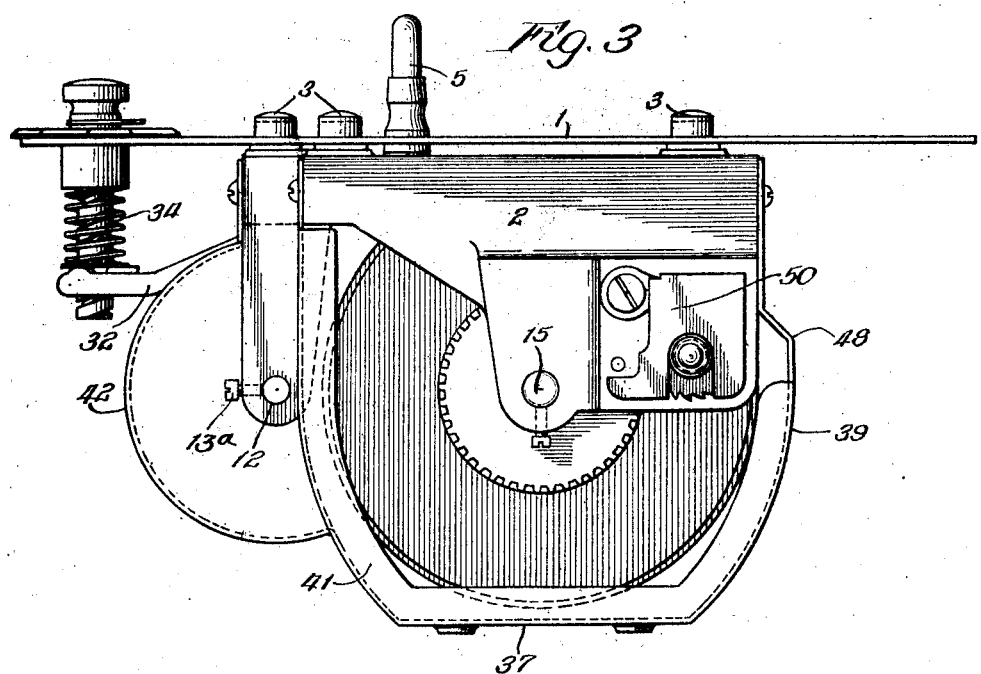
Fig. 3 is an end elevation looking at the end opposite to that shown in Fig. 1.
Figure 4:
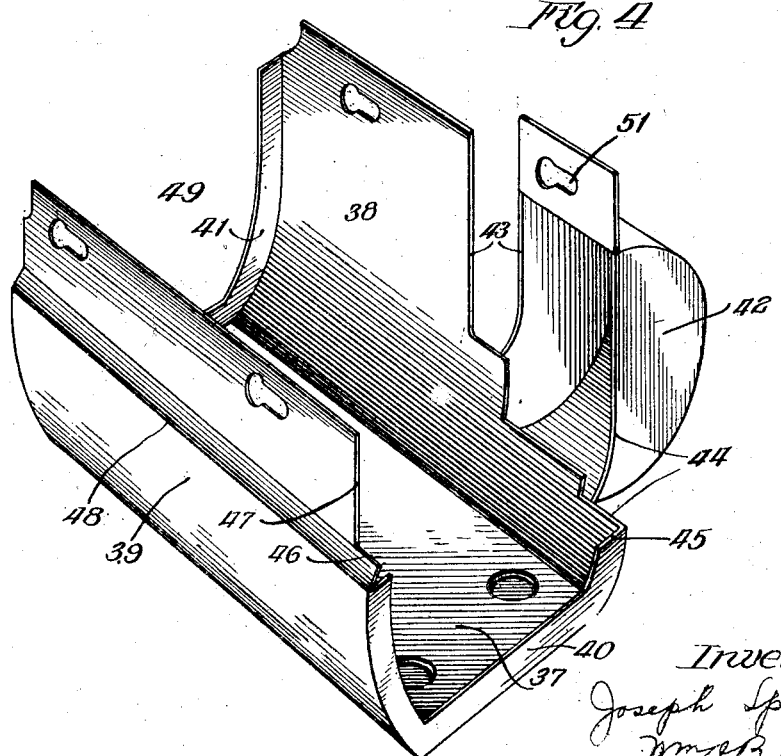
Fig. 4 is a perspective view of the combined housing and support.

I have shown the invention in a form suitable for application to a motor of a specific form and construction and have indicated how the sides and ends of the housing should be cut away in order to expose the bearings or other parts of the motor likely to require attention.

In the drawings 1 indicates a top plate from which the motor generally indicated at 2 is suspended by the bolts 3. The motor includes a frame 4 in which the spindle 5 is journalled in suitable bearings 6 and 7 and provided with a worm 8, meshing with the worm gear 9 on the shaft 10 having suitable bearings 11 and 12 in the frame 4. These bearings may be adjustable, and I have shown screws 13 and 13ª for holding them in place. The shaft 10 is equipped with a pinion not shown, meshing with the gear 14 rotating on the shaft 15 and driven by the springs or other source of power. The spindle 5 is also equipped with a worm gear 16 meshing with a worm 17 on a governor shaft 18 mounted in suitable bearings 19 and 20, held in adjustment by the screws 21 and 22. Freely mounted on the shaft 18 is a sleeve 23 having a collar 24 at one end and a drum 25 at the other, and springs 26 are connected at one end to the collar 24 and at the opposite end to a collar (not shown) fixed to the shaft 18. The springs 26 are equipped with weights 30 which act in the customary manner, to move the drum 25 to the right in Fig. 1, in contact with the brake pad 31 carried by a lever 32 pivoted at 33 and adapted to be adjusted by the screw mechanism 34. The pad 31 is carried by a screw 35 which can be adjusted in the boss 36 in the lever.

The combined housing and support includes the base 37 here shown as flat but which may be made of any suitable configuration so long as it is suited to form a stable base for a motor to rest upon. Attached to, and preferably made integrally with the base 37 are the side pieces 38 and 39, and connected to the side pieces and the base are a pair of end pieces 40 and 41. The side 38 is provided with the semicircular pocket 42 to house the gear 9 and the pinion carried by the shaft 10. The side piece 38 is cut away at 43 and 44 on each side of the pocket 42 in order to expose the locking screws 13 and 13ª for the bearings of the shaft 10, the end of one bearing 20, of the governor shaft, and one end bearing of the shaft 10. The end 40 is cut away at 45 to expose one bearing of the shaft 10 and the locking screw 22 of the governor shaft 18. It is also cut away at 46 to expose the locking screw 21 of the bearing 19. The side 39 is cut away at 47 to expose the bearing 19, and is provided with an offset 48 to provide space for the spring barrels and the gear 14. The end 41 is cut away at 49 to expose the ratchet mechanism 50. Both ends are cut out in the middle to make room, but a sufficient portion of each is retained near the base to form a pan for the reception of any lubricant or any other drippings from the motor; also, there is a portion of each end retained adjacent to the sides to form stiffening ribs therefor. The sides are provided with perforations 51 through which screws pass for securing the housing and support to the frame of the motor.

Heretofore it has been customary to provide a special fixture on which to rest the motor when it is being tested and adjusted; by the use of a housing and support made according to my invention the motor is at all times equipped with a substantial and satisfactory support; which while housing and protecting a greater portion of the parts likely to be injured, is arranged to expose for easy access all parts likely to require attention or adjustment; also this device is arranged to perform the function of an oilpan.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. In a phonograph or the like having a plate supporting a motor driven device, motor mechanism including a frame and moving parts carried by the frame, means for detachably securing the frame to the plate, and a housing for the motor mechanism supported by the frame, the housing having a base member adapted to rest upon a flat surface to support the motor mechanism when the frame is detached from the plate.

2. In a phonograph or the like having a plate for supporting a motor driven device, motor mechanism including a frame and moving parts carried by the frame, means for detachably securing the frame to the plate, and a housing for the motor mechanism carried by the frame and comprising side members, end members and a base adapted to rest upon a flat surface to support the motor mechanism when the frame is detached from the plate.

3. In a phonograph or the like having a plate for supporting a motor driven device, motor mechanism including a frame and moving parts carried by the frame, means for detachably securing the frame to the plate, and a housing for the motor mechanism carried by the frame and comprising a base member adapted to rest upon a flat surface to support the motor mechanism when the frame is detached from the plate, side members and end members, the side members and end members being cut away to expose parts of the motor most likely to require attention or adjustment.

4. In a phonograph or the like having a plate for supporting a motor driven device, motor mechanism including a frame and moving parts carried by the frame, means for detachably securing the frame to the plate, and a housing for the motor mechanism carried by the frame and comprising a base member adapted to rest upon a flat surface to support the motor mechanism when the frame is detached from the plate, and side and end members surrounding the base to form a pan.

JOSEPH SPRING.